Nov. 20, 1951  R. C. SCHUM  2,576,048
TRUCK FOR HANDLING CYLINDERS OF
COMPRESSED GAS OR THE LIKE
Filed Aug. 18, 1949  3 Sheets-Sheet 1
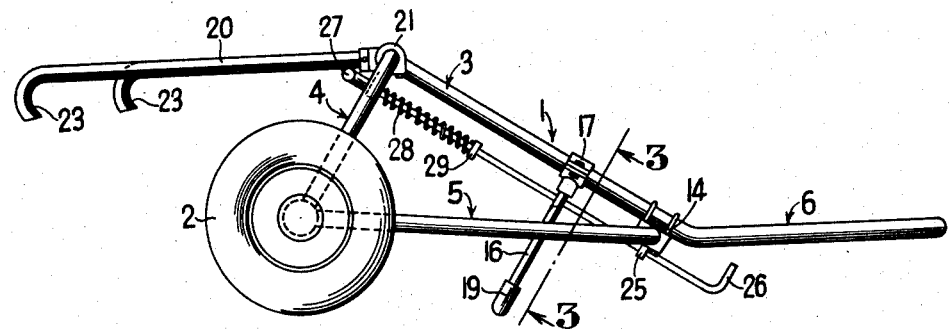
Fig.1
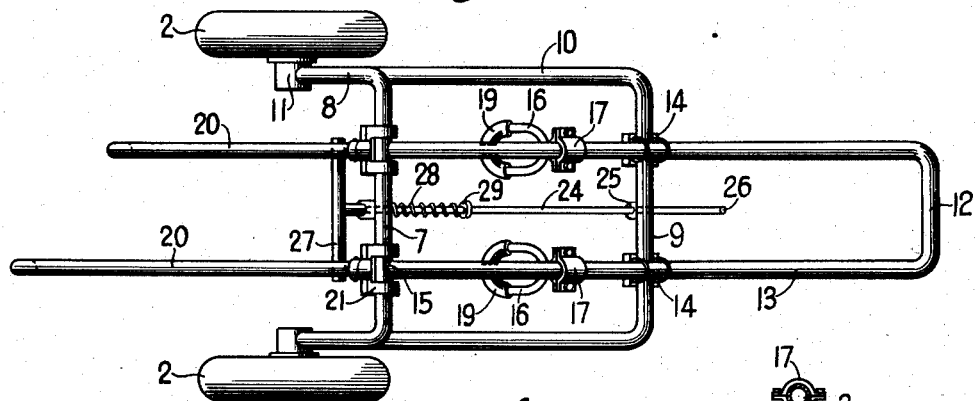
Fig.2
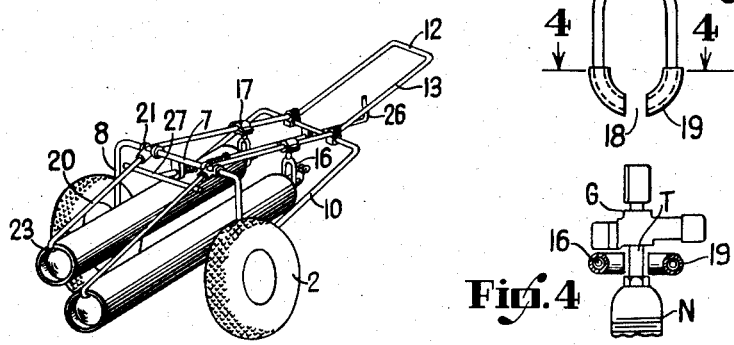
Fig.3
Fig.5
Fig.4
INVENTOR.
Ralph C. Schum.
BY
ATTORNEYS Nov. 20, 1951  R. C. SCHUM  2,576,048
TRUCK FOR HANDLING CYLINDERS OF
COMPRESSED GAS OR THE LIKE
Filed Aug. 18, 1949  3 Sheets-Sheet 2

INVENTOR.
Ralph C. Schum.
BY
ATTORNEYS

Nov. 20, 1951 R. C. SCHUM 2,576,048
TRUCK FOR HANDLING CYLINDERS OF
COMPRESSED GAS OR THE LIKE
Filed Aug. 18, 1949 3 Sheets-Sheet 3

INVENTOR.
Ralph C. Schum.
BY
ATTORNEYS

Patented Nov. 20, 1951

2,576,048

UNITED STATES PATENT OFFICE 2,576,048

TRUCK FOR HANDLING CYLINDERS OF COMPRESSED GAS OR THE LIKE

Ralph C. Schum, Ironton, Ohio, assignor of one-half to Allison Parsons, Ironton, Ohio Application August 18, 1949, Serial No. 110,954

18 Claims. (Cl. 214—65.4)

My invention relates to a truck for handling cylinders of compressed gas or the like. It has to do, more particularly, with a hand truck for supporting and moving the large heavy cylinders or bottles which contain compressed gas, such as oxygen or acetylene.

As is well known, gas under pressure for use in welding and for other purposes is sold and supplied in large cylinders or bottles. Because it is necessary to withstand the pressure of the gas, these cylinders or bottles are very heavy and are difficult to handle. The cylinders or bottles usually are provided with threaded necks which are ordinarily protected by caps. However, it is necessary to remove these caps when the gas is to be used and quite often gauges are mounted on the threaded necks. In handling the bottles after the gauges are mounted thereon, they must be so handled that the gauges are not damaged and this is difficult.

One of the objects of my invention is to provide a simple hand truck for handling cylinders or bottles of the type indicated, the truck being so designed and constructed that the bottles can be handled with ease and safely by one man.

Another object of my invention is to provide a truck which is designed to handle two bottles of different sizes which makes it particularly suitable for handling the two bottles ordinarily used in oxy-acetylene welding.

Another object of my invention is to provide a truck of the type indicated which is so designed that it can be moved over the bottles and be manipulated to lift the bottles on the truck without direct lifting by the person using the truck.

Still another object of my invention is to provide a handling truck of the type indicated which is so designed and constructed that the bottles may be released and lowered to the floor or ground with ease whenever desired.

A further object of my invention is to provide a truck of the type indicated which is so designed that the bottles can be handled without injury thereto and especially without injury to any gauges mounted on the necks thereof.

Various other objects will be apparent.

According to my invention, I provide a truck which embodies a frame carried by a pair of wheels. On the frame behind the wheels I provide depending yokes for receiving the necks of bottles or cylinders of the type indicated above. Ahead of the wheels I provide lever hooks which are pivoted on the frame for vertical movement and are adapted to engage the concave ends of the bottles. In picking up the bottles, the truck is moved over the bottles so that the wheels straddle them and the necks thereof move into the depending yokes at the rear of the frame. The rear end of the truck is then lifted to lift the neck ends of the bottles and at the same time the forward ends of the pivoted lever hooks will slide along the top surfaces of the bottles until the hook portions drop over the extreme lower ends of the bottles. Then if the rear end of the truck is lowered, the bottoms of the bottles are firmly engaged by the hooks and the bottles are moved slightly longitudinally rearwardly until the necks are firmly engaged with the yokes. The bottles are now supported on the truck for movement to any desired location. To release the bottles, I provide an arrangement for swinging the lever hooks upwardly out of engagement with the bottom of the bottles. At this time the bottoms of the bottles are preferably in contact with the ground or floor and when the lever hooks are released, the truck may be pulled rearwardly to release the necks of the bottles from the yokes.

The preferred embodiment of my invention is illustrated in the accompanying drawings wherein similar characters of reference designate corresponding parts and wherein:

Figure 1 is a side elevational view of a truck made according to my invention.

Figure 2 is a plan view of the truck.

Figure 3 is a transverse sectional view taken along line 3—3 of Figure 1.

Figure 4 is a transverse sectional view taken along line 4—4 of Figure 3 and showing how the yoke can slip over the tube used in mounting the gauge on the neck of a bottle.

Figure 5 is a perspective view of the truck showing it carrying two bottles.

Figure 6:
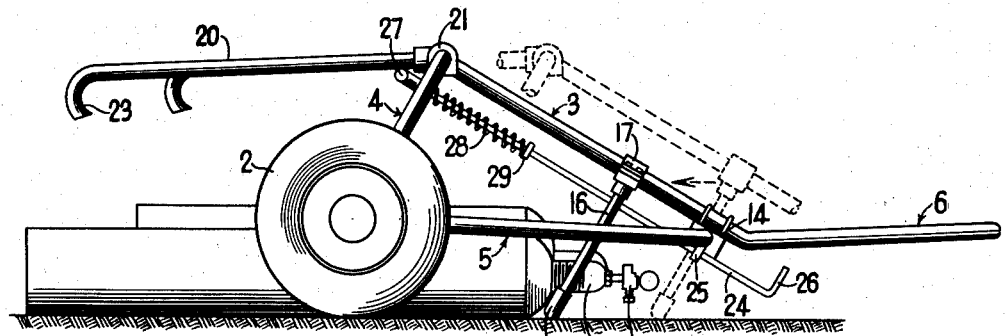
Figure 6 is a side elevational view illustrating the first steps in lifting the bottles with the truck of Figures 1 to 5.

With reference to the drawings, my truck comprises a frame 1 carried by the pair of wheels 2. The wheels 2 preferably are the type to receive pneumatic tires. The frame in side elevation is mainly of triangular form being provided with the top section 3, the forward section 4 which is at right angles to section 3, and the bracing section 5 which connects the lower end of section 4 to the rear end of section 3. The section 3 is provided with an angularly disposed rear section 6 which serves as a handle section.

The forward frame section 4 is of inverted U-form having the transverse horizontal portion 7 and the depending legs 8. The top section 3 is of U-shape having the transverse portion 9 and the forwardly extending arms 10. The sections 3 and 4 are of the same width and the legs 10 are joined to the arms 7 at bearing housings 11 to which they may be welded. These housings 11 will support the axles for the wheels 2. The frame section 3 is also of U-form being provided with the transverse portion 12 at the rear end of the handle section 6 and being provided with the forwardly extending arms 13. The arms 13 are closer together than the arms 10 and legs 8 with which they are parallel. It will be noted that the frame section 3 is centered laterally relative to the sections 4 and 5 and is rigidly secured to such sections. Clamps 14 are provided for clamping the arms 13 to the transverse portion 9 while the forward ends of the arms 13 are welded or otherwise rigidly secured at 15 to the transverse member 7. Thus, a rigid frame is provided which is composed of the various sections and each section is preferably formed of tubular metal members.

Adjacent the transverse member 9 but slightly forwardly thereof, the arms 13 carry depending bottle-engaging yokes 16. These yokes are substantially in the form of loops or ovals of tubular metal, as indicated best in Figure 3. They are rigidly secured in the same transverse plane to the arms 13 by means of clamping collars 17. The members 16 are split at their lower sides, as indicated at 18. They may carry rubber sleeves 19 which will prevent damage to the threads on the necks of the bottles, as will later appear.

At the forward end of the frame, I provide a pair of lever hooks 20 which are in the same vertical planes as the arms 13 and extend forwardly therefrom. These hooks 20 have their rear ends secured to bearing brackets 21 which are rotatably mounted on transverse portion 7 of frame section 4 so that the hooks may swing vertically. The hooks are shown of unequal length so that the truck can be used for handling bottles of unequal lengths. It will be noted that the hooks 20 will not move laterally because the bearing members 21 straddle the arms 13. The forward end of each hook is provided with a downturned hook portion 23.

In order to swing the lever hooks 20 upwardly to release them from the bottles, in the manner which will be apparent hereinafter, I provide the release mechanism illustrated best in Figures 1 and 2. This mechanism comprises a longitudinally movable rotatable actuating rod 24. This rod is carried for slidable and rotative movement in bearing lugs 25 depending from frame members 7 and 9 and located centrally laterally thereof. The rear end of the rod is provided with a portion 26 bent at right angles to provide a handle while the forward end of the rod is provided with a transverse pin 27. A compression spring 28 is disposed on the rod between a stop collar 29 and the forward lug 25. This spring will normally keep the rod in its rear position. However, the rod may be pushed forwardly to swing both of the hooks 20 upwardly simultaneously or it may be rotated about its axis to cause the pin 27 to swing upwardly into engagement with either of the hooks to release only the one hook.

Figure 7:
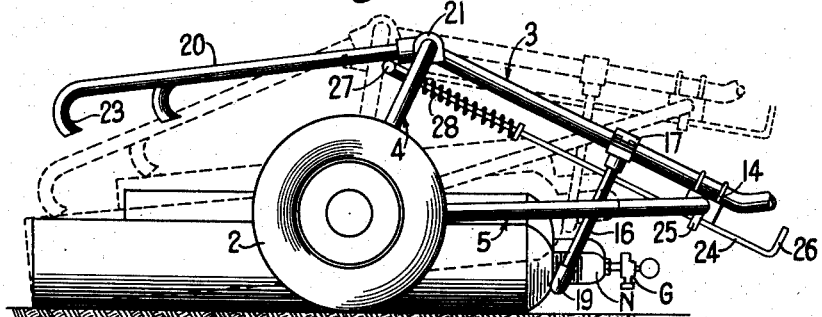
Figures 7 and 8 illustrate successive steps in the lifting operation.
Figure 8:
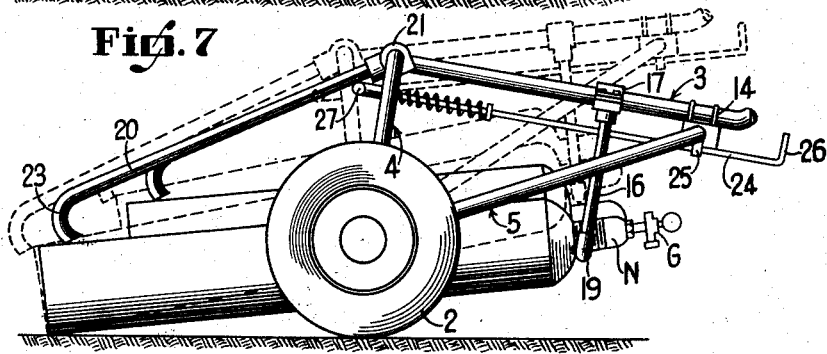
Figure 9:
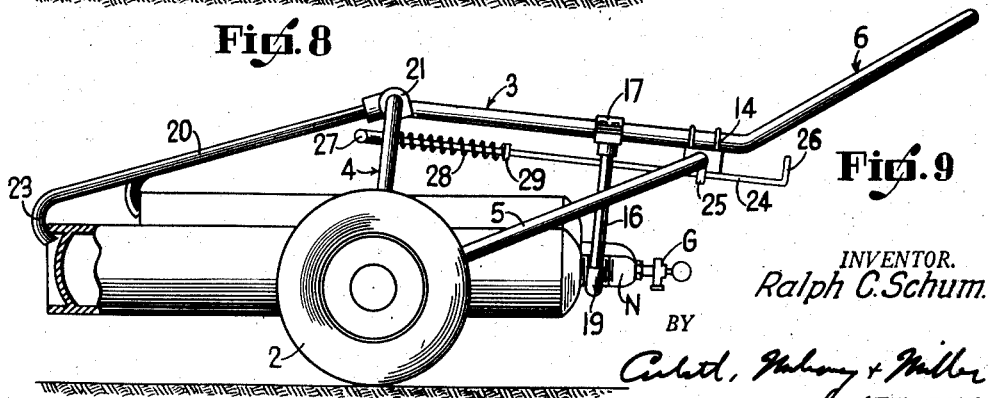
Figure 9 is a side elevational view showing the bottles after they have been completely lifted by the truck.

In using this truck, assuming that it is to pick up two bottles of unequal length, for example, a container for acetylene gas and a container for oxygen, the two containers will be disposed on the ground or floor in parallel relationship and the truck will then be moved over both simultaneously with the wheels 2 straddling them. The bottle may or may not have a gauge G on its upper end but in this instance I have shown a gauge mounted thereon. As illustrated in Figure 6, when the truck is moved over the bottles, the threaded necks N are received within the depending yokes 16. To position the yokes on the necks if the gauges G are on the bottles, it is first necessary to move the yokes downwardly over the tubular portion T (Figure 4) which is permitted by the slots 18. Then the yokes can be moved forwardly over the necks, as shown in Figure 6. The position of the yokes 16 can be accurately adjusted by releasing and repositioning the clamps 17. This will vary the distance from the yokes to the hook portions 23 and this distance can be accurately adjusted in accordance with the lengths of the bottles. The next step is to lift the rear end of the truck by the handle 6, it being understood that the wheels 2 are positioned to distribute the weight. This lifts the yokes into engagement with the necks N which are larger than tubes T and which will not pass through slots 18. The rubber sleeves 19 will protect the threads on the necks. Lifting the rear end of the truck will, as indicated in Figures 7 and 8, lift the neck ends of the bottles and will cause the upper end of frame section 4 to swing forwardly about the wheel axles and to move the hooks 20 along the top surfaces of the bottles towards the bottom ends thereof. Continued lifting in this manner will move the hook portions 23 forwardly until they drop over the concave bottoms of the bottles. Then if the rear end of the frame is lowered, the upper end of frame section 4 will swing rearwardly and pull the hooks 23 rearwardly thereby causing the bottles to move firmly into engagement with the yokes 16. The bottles will now be supported for movement by the truck. To release both bottles simultaneously, the front end of the truck is lowered until the bottoms of the bottles contact the floor or ground. This relieves some of the tension on the hooks 20. To disengage the hook portions 23 from the bottles, it is merely necessary to move the rod 24 forwardly thereby causing pin 27 to swing the hooks upwardly. If one hook only is to be released, the rod 24 may merely be rotated.

Figure 10:
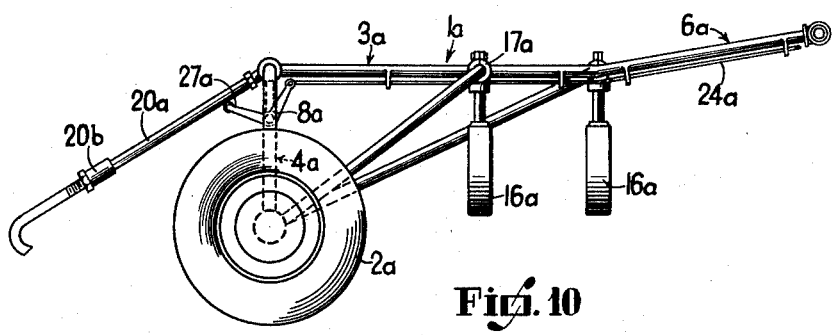
Figure 10 is a side elevational view of another form of my truck.
Figure 11:
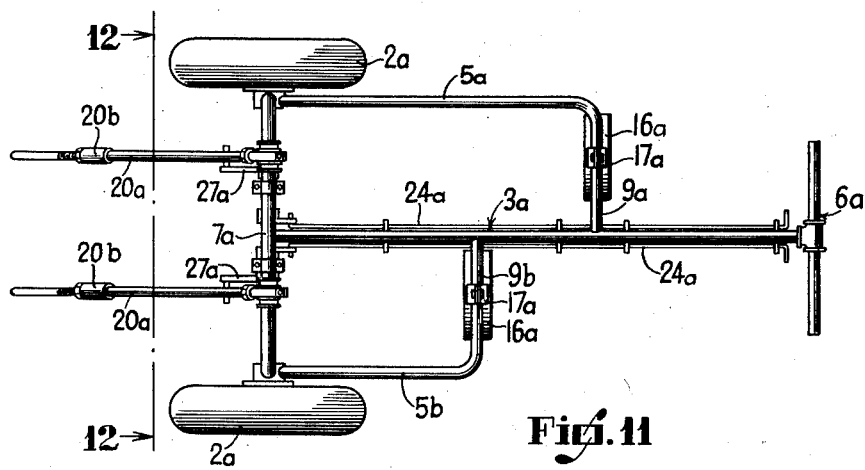
Figure 11 is a plan view of the truck of Figure 10.
Figure 12:
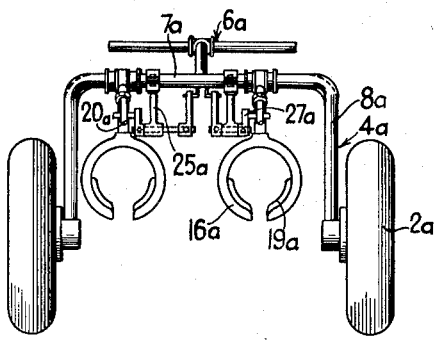
Figure 12 is a transverse sectional view taken along line 12—12 of Figure 11.

In Figures 10 to 12, I have illustrated another form of my truck. In this instance, the frame 1a includes the central tongue or handle 3a which has a transverse handle 6a at its rear end and which is rigidly connected at its forward end to the transverse portion 7a of frame section 4a, The portion 7a has the depending legs 8a which carry the wheels 2a. A bracing section 5a is provided at one side of the frame between the leg 8a at that side and the tongue 3a and a similar bracing section 5b is provided at the opposite side of the frame. The section 5a has a transverse rear portion 9a and the section 5b has a transverse rear portion 9b which are connected to the tongue 3a at axially spaced points. The portions 9a and 9b are adapted to carry the depending yokes 16a which are rigidly clamped thereto by clamps 17a. The forward portion of the frame carries the pivoted hooks 20a which are of equal length and pivoted to the transverse member 7a at their rear ends. The length of the hooks 20a are accurately adjustable by means of turnbuckles 20b. Each of the hooks may be swung vertically independently by releasing mechanism. Each releasing mechanism takes the form of a rod 24a slidably mounted on the tongue 3a and actuating a bell crank 27a pivoted to a depending bracket 25a carried by transverse member 7a. The bell crank lever carries a pin which engages the adjacent lever hook 20a. Thus, either hook may be moved independently of the other.

This structure will function substantially the same as the other truck with the exception that the bottles will be picked up individually, the truck being manipulated over each bottle successively. It will be noted that each yoke 16a is provided with liner sections 19a of rubber to protect the neck of the bottle.

It will be apparent from the above description that I have provided a compressed gas bottling handling truck which has many advantages. The bottles can be handled with little effort and without damage thereto. The apparatus is simple and can be constructed at a low cost.

Various other advantages will be apparent.

Having thus described my invention, what I claim is:

1. A truck for handling bottles for compressed gas or the like having a neck thereon, comprising a frame supported by wheels, said frame including an upstanding portion pivoted for movement about the wheel axes, a rearwardly extending frame portion having a depending yoke spaced rearwardly from the wheel axes and adapted to engage the neck of a bottle, and a lever hook pivoted for free vertical swinging movement to the upstanding frame portion above the wheel axes and having a hook at its forward end, the free vertical movement of the lever permitting it to slide along the side surface of the bottle and to engage the bottom thereof upon forward swinging of said upstanding frame portion after said yoke is engaged with the bottle.

2. A truck according to claim 1 wherein hook release mechanism is mounted on said frame, said mechanism including an actuating handle and means engaging said lever for swinging it upwardly.

3. A truck according to claim 1 wherein the yoke is provided with a slot at its lower side.

4. A truck according to claim 1 wherein the yoke is provided with rubber sections for engaging the neck of the bottle.

5. A truck according to claim 1 wherein a plurality of lever hooks are mounted on the upstanding portion of the frame and wherein means is provided for releasing either of said hooks independently of the other.

6. A truck according to claim 5 wherein said means comprises bell crank levers carried by the frame and engaging the hooks, and actuating means carried by the frame for actuating each of said bell crank levers independently of the other.

7. A truck for handling bottles for compressed gas or the like and each of which has a neck thereon, comprising a frame supported by wheels, said frame including an upstanding portion pivoted for movement about the wheel axes, a rearwardly extending frame portion having a plurality of depending yokes spaced rearwardly from the wheel axes and transversely aligned and laterally spaced so as to engage the necks of bottles disposed side-by-side, and a plurality of longitudinally extending lever hooks of unequal lengths carried by said upstanding portion of said frame and disposed in laterally spaced relationship in alignment with said yokes, each of said lever hooks being pivoted to the upstanding frame portion above the wheel axes and having a hook at its forward end for engaging the bottom of a bottle.

8. A truck according to claim 7 wherein a pair of yokes and a pair of cooperating hooks are provided.

9. A truck according to claim 8 wherein releasing mechanism is carried by the frame for releasing the hooks, said releasing mechanism comprising a reciprocable and rotatable rod extending longitudinally of the frame, and a transverse pin at the forward end of the rod for engaging either or both of said hooks.

10. A truck according to claim 7 wherein a pair of yokes and a pair of cooperating hooks are provided and wherein the yokes are adjustable longitudinally of the frame and relative to the hooks on the levers.

11. A truck according to claim 7 wherein each of the yokes is provided with a slot at its lower side.

12. A truck according to claim 11 wherein each of the yokes carries rubber sections for engaging the neck of a bottle.

13. A truck for handling bottles for compressed gas or the like and each of which has a neck thereon, comprising a frame supported by wheels, said frame including an upstanding portion pivoted for movement about the wheel axes, a rearwardly extending frame portion having a plurality of depending yokes spaced different distances rearwardly from the wheel axes and laterally spaced so as to engage the necks of bottles disposed side-by-side, and a plurality of longitudinally extending lever hooks carried by said upstanding portion of said frame and disposed in laterally spaced relationship in alignment with said yokes, each of said lever hooks being pivoted to the upstanding frame portion above the wheel axes and having a hook at its forward end for engaging the bottom of a bottle.

14. A truck according to claim 13 wherein the lever hooks are provided with means for adjusting the lengths thereof.

15. A truck according to claim 13 wherein each of the yokes is provided with a slot at its lower side.

16. A truck according to claim 15 wherein each of the yokes carries rubber sections for engaging the neck of the bottle.

17. A truck according to claim 13 wherein means is provided for releasing either of said hooks independently of the other, said means comprising bell crank levers carried by the frame and engaging the hooks, and actuating means carried by the frame for actuating each of said bell crank levers independently of the other.

18. A truck according to claim 1 wherein a plurality of lever hooks are mounted on the upstanding portion of the frame and wherein means is provided for releasing either of said hooks independently of the other, said means comprising a reciprocable and rotatable rod extending longitudinally of the frame, and a transverse pin at the forward end of the rod for engaging either or both of said hooks.

RALPH C. SCHUM.

REFERENCES CITED

The following references are of record in the file of this patent:

UNITED STATES PATENTS

| Number | Name | Date |
|---|---|---|
| 310,362 | Bestor | Jan. 6, 1885 |
| 2,019,256 | Dutton | Oct. 29, 1935 |
| 2,340,812 | Koob | Feb. 1, 1944 |
| 2,381,858 | Austin | Aug. 14, 1945 |

FOREIGN PATENTS

| Number | Country | Date |
|---|---|---|
| 356,876 | Germany | Aug. 4, 1922 |
| 39,281 | Norway | July 7, 1924 |
| 782,403 | France | Mar. 18, 1935 |